(12) United States Patent
Kittelson et al.

(10) Patent No.: US 7,819,454 B2
(45) Date of Patent: Oct. 26, 2010

(54) CABINET CLEAT

(75) Inventors: Robert C. Kittelson, Fort Wayne, IN (US); Joel D. Reed, New Haven, IN (US); Patrick E. Temple, Wapakoneta, OH (US); Timothy G. Siebert, Fort Wayne, IN (US); Charles W. Kipfer, Payne, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 299 days.

(21) Appl. No.: 12/046,115

(22) Filed: Mar. 11, 2008

(65) Prior Publication Data
US 2009/0230711 A1 Sep. 17, 2009

(51) Int. Cl.
*B60R 7/00* (2006.01)
(52) U.S. Cl. .............. 296/37.8; 296/190.08; 296/29; 312/245; 312/351.1
(58) Field of Classification Search .......... 312/245, 312/351.1; 296/37.7, 37.87, 186.1, 190.01, 296/190.08, 193.04, 29, 190.1; 29/407.07, 29/407.09; 248/224.8, 225.11, 225.21, 300; 410/89, 144
See application file for complete search history.

(56) References Cited

U.S. PATENT DOCUMENTS

| | | | | |
|---|---|---|---|---|
| 1,087,302 | A * | 2/1914 | Kobert | 248/73 |
| 1,657,939 | A * | 1/1928 | Rockwell | 248/73 |
| 1,775,391 | A * | 9/1930 | Fassinger | 248/73 |
| 4,181,279 | A * | 1/1980 | Perrault et al. | 248/70 |
| 4,826,115 | A * | 5/1989 | Novitski | 248/224.8 |
| 5,108,048 | A | 4/1992 | Chang | |
| 5,549,258 | A | 8/1996 | Hart | |
| 5,582,376 | A * | 12/1996 | Thompson | 248/214 |
| 5,819,958 | A * | 10/1998 | Dement | 211/90.01 |
| 5,893,616 | A * | 4/1999 | MacDonald et al. | 312/245 |
| 6,076,904 | A * | 6/2000 | Shepherd et al. | 312/209 |
| 6,318,671 | B1 | 11/2001 | Schumacher | |
| 6,733,061 | B1 | 5/2004 | Dykema | |
| 6,742,832 | B1 * | 6/2004 | Miskech et al. | 296/183.1 |
| 7,013,546 | B2 | 3/2006 | Dykema | |
| 2006/0021985 | A1 * | 2/2006 | Jasper | 220/475 |
| 2008/0169667 | A1 * | 7/2008 | Siniarski et al. | 296/37.8 |

* cited by examiner

*Primary Examiner*—Jason S Morrow
(74) *Attorney, Agent, or Firm*—Jeffrey P. Calfa; Mark C. Bach; Gerald W. Askew

(57) ABSTRACT

A vehicle cabinet having cabinet cleats used in conjunction with a vehicle cabin having cabinet cleat receivers is provided for use with a vehicle for operation on the ground. The cabinet cleat receivers cooperate with the cabinet cleats in such a way that locating the receivers with the cleats is easy and requires minimal manipulation by an installer. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

7 Claims, 22 Drawing Sheets

VEHICLE CABIN WITH CABINET
SHOWING CLEATS ENGAGED WITH RECEIVERS

VEHICLE CABIN WITH CABINET

VEHICLE CABIN WITH
CLEAT RECEIVERS

CABINET WITH CLEATS

CABINET WITH CLEATS

VEHICLE CABIN WITH CABINET
SHOWING CLEATS ENGAGED WITH RECEIVERS

CABINET REAR VIEW SHOWING
CLEATS ENGAGED WITH RECEIVERS

CABINET SIDE VIEW SHOWING
CLEATS ENGAGED WITH RECEIVERS

CLEAT ENGAGED WITH RECEIVER

CLEAT ENGAGED WITH RECEIVER

SIDE VIEW SECTIONAL OF CABINET,
CLEAT ENGAGED WITH RECEIVER

SIDE VIEW SECTIONAL OF CABINET,
CLEAT ENGAGED WITH RECEIVER

SIDE VIEW SECTIONAL OF CABINET,
CLEAT ENGAGED WITH RECEIVER

SECTIONAL VIEW OF CLEAT
ENGAGED WITH RECEIVER

VEHICLE CABIN SHEET-METAL
SHOWING CLEAT RECEIVER DETAIL

CABINET WITH CLEATS

CABINET WITH CLEATS INSTALLED

CABINET WITH CLEATS INSTALLED,
REAR VIEW

CABINET WITH CLEATS INSTALLED,
PARTIAL REAR VIEW

CABINET WITH CLEATS INSTALLED,
SIDE VIEW

CLEAT ENGAGED WITH RECEIVER

VEHICLE CABINET SHOWING MOUNTING HOLES

CABINET CLEAT

FIELD OF THE INVENTION

This invention relates to the installation of heavy structures, particularly cabinets, in vehicle cabins during the process of assembly. Vehicles such as line haul trucks and recreational vehicles often are provided with cabinets for the storage of clothing, tools, food, supplies, and other articles. These cabinets are often installed in a relatively complete configuration, in order to minimize secondary operations needed to complete them on an assembly line. As a result, the cabinets are usually quite heavy at the point of installation, requiring physical strength by the line operator in order to hold them in proper alignment until they are fastened into place. Alternately, fixtures and mechanical devices are sometimes used to hold such cabinets in place until such time as they are fastened securely. A need exists for a simple, inexpensive, and effective way to rapidly install such cabinets in place without the need for fixtures or mechanical devices, and without relying on installers to support and correctly position them until they are fastened into place.

BACKGROUND

It is known to utilize a cleat, or even a keyhole feature, to facilitate the mounting of heavy structures such as cabinets in vehicle cabins during assembly. Such cleats are often in the form of a sill formed out of sheet metal having a J-shaped cross section attached to the interior of the vehicle cabin, and a mating inverted J-shaped cross section attached to the rear of the cabinet. The two J-shapes interlock and support the cabinet during installation. However, they do not positively locate the cabinet from side to side, requiring an alignment operation, nor do they contribute significantly to the strength of the attachment once the cabinet is permanently installed. They also involve the use of additional parts, contributing to the overall cost of the vehicle.

Keyhole mounting features do positively locate the cabinet, once the mating stud is inserted in place. However, the difficulty associated with keyhole mounting features is "finding" the keyhole with the stud, which is usually fully obscured from the installer by the body of the cabinet. This results in the installer having to not only support the cabinet until the stud engages the keyhole, but also manipulating it back and forth, and up and down, until the stud is felt to have so engaged the hole. Depending on the tolerances of the stud and keyhole, they may not contribute significantly to the strength of the attachment at least until significant deformation has occurred to the regular attachment points.

SUMMARY OF THE INVENTION

The invention disclosed herein solves the problems of the prior art by providing a self-aligning cleat assembly which is easy for an installer to locate. The cleat assembly has a formed cleat on the back of a cabinet, and a formed receiver in the sheet metal of a vehicle cabin. The cleat assembly supports and positively locates the cabinet until the cabinet is securely fastened to the interior of the vehicle cabin. Further, the cleat may be formed out of the parent material of the cabinet and receiver may be formed out of the cabin sheet metal. It contributes to the strength of the mounting of the cabinet, which must have a minimum overall strength of twenty times the weight of the cabinet in order to meet crash worthiness standards. The installer must only raise the cabinet until the cleat on the rear of the cabinet is above the receiver in the sheet metal of the vehicle cabin, then lower the cabinet until the cleat engages the receiver. A slight side to side adjustment will cause the cleat to drop into a lower notch, and the cabinet is securely and positively located. Once the cabinet is in its final position, additional fasteners are used to secure it to the wall of the vehicle cabin.

The cleat is approximately Z-shaped, and may be angled in such a way that gravity draws the cabinet closer to the wall. The receiver has a wide portion, which allows it to capture the cleat with minimal manipulation by the installer. It also has a narrow lower notch, into which the cleat drops when installed. This narrow lower notch may have vertical sides, or they may be tapered to minimize the side to side adjustment required to initiate the drop of the cleat into the lower notch. The cleat and receiver may be so spaced and dimensioned such that it contributes to the ultimate pull-away strength of the cabinet from the cabin wall after minimum deflection of the regular mounting surfaces and fasteners.

As described above, the Cabinet Cleat and a vehicle made with this device provide a number of advantages, some of which have been described above and others of which are inherent in the invention. Also, modifications may be proposed to the Cabinet Cleat or a vehicle made with this device without departing from the teachings herein.

DETAILED DESCRIPTION OF THE INVENTION

Figure 1:
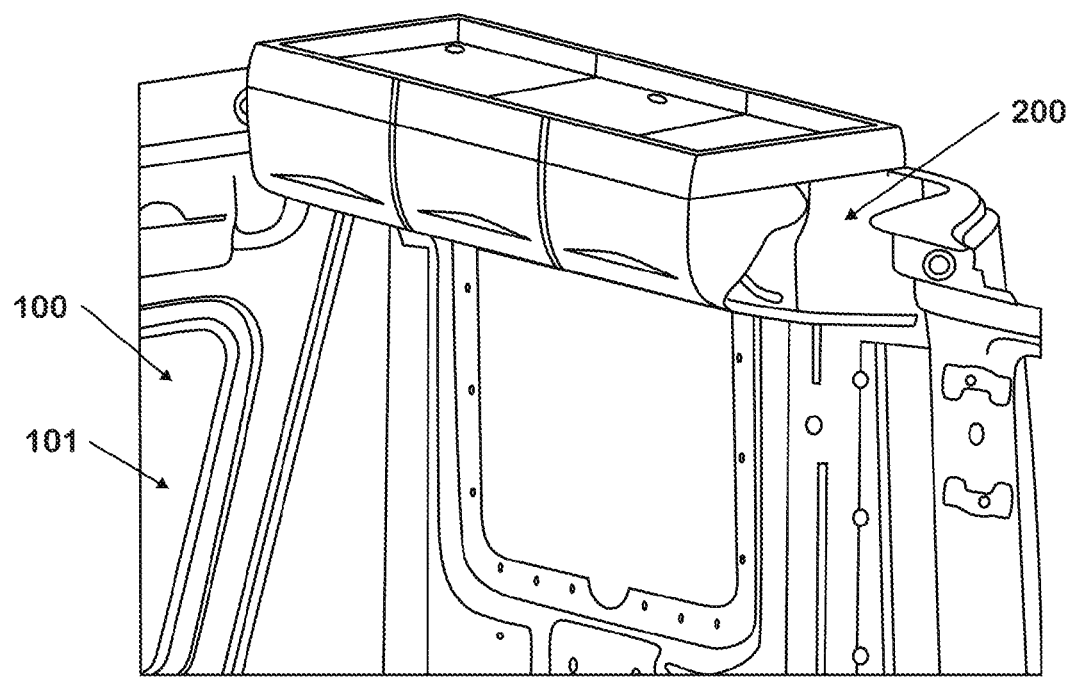
FIG. 1—An embodiment of the present invention, a vehicle cabin showing a cabinet installed, isometric front view.

FIG. 1 shows a vehicle cabin 100 constructed of vehicle cabin sheet metal 101. A cabinet 200 is attached to the vehicle cabin sheet metal 101 by means of cleats 300 (not shown) and cleat receivers 400 (not shown).

Figure 2:
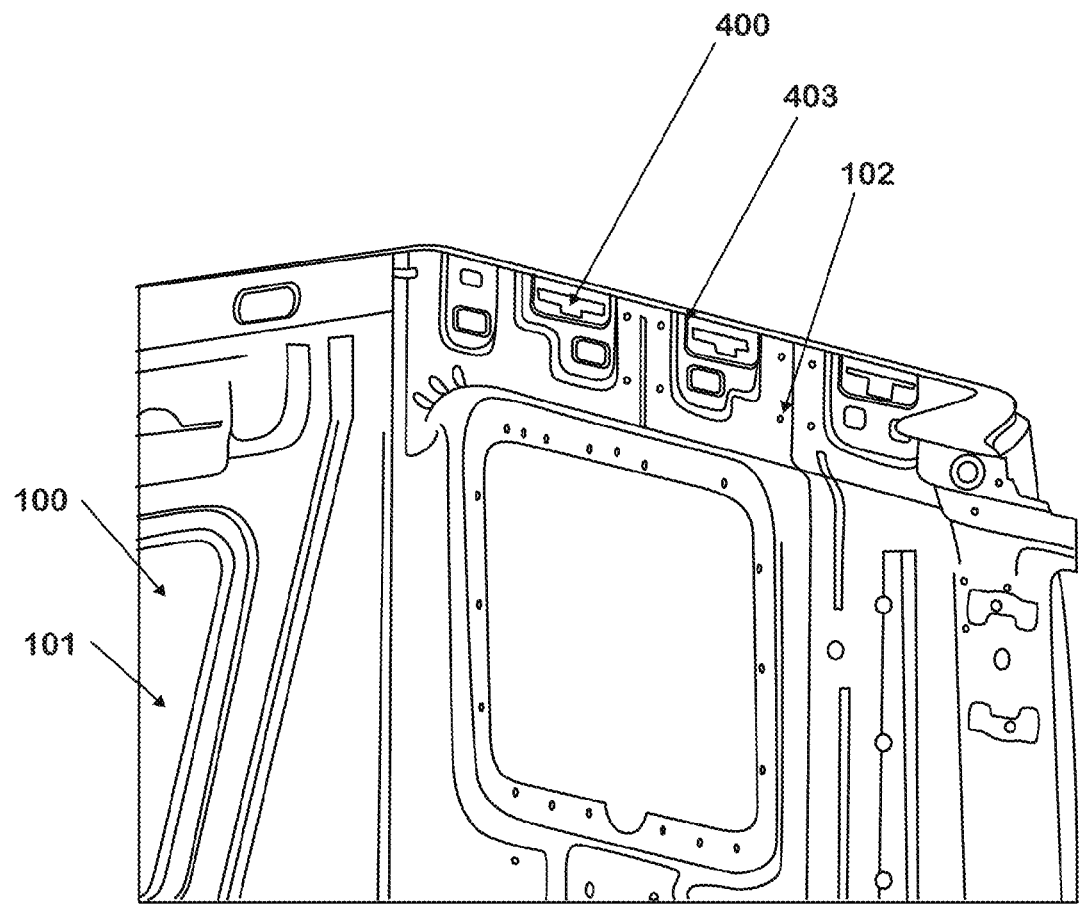
FIG. 2—An embodiment of the present invention, a vehicle cabin prepared to receive a cabinet having mounting cleats, showing cleat receivers, isometric front view.

FIG. 2 again shows a vehicle cabin 100 constructed of vehicle cabin sheet metal 101. The vehicle cabin sheet metal 101 is provided with cleat receivers 400 and mounting holes 102, for the attachment of one or more cabinets 200 (not shown). The cleat receivers 400 have formed cleat receiver reinforcing material offsets 403, in order to reduce strain in the vehicle cabin sheet metal 101, and to provide firm support for the one or more cabinets 200 (not shown).

Figure 3:
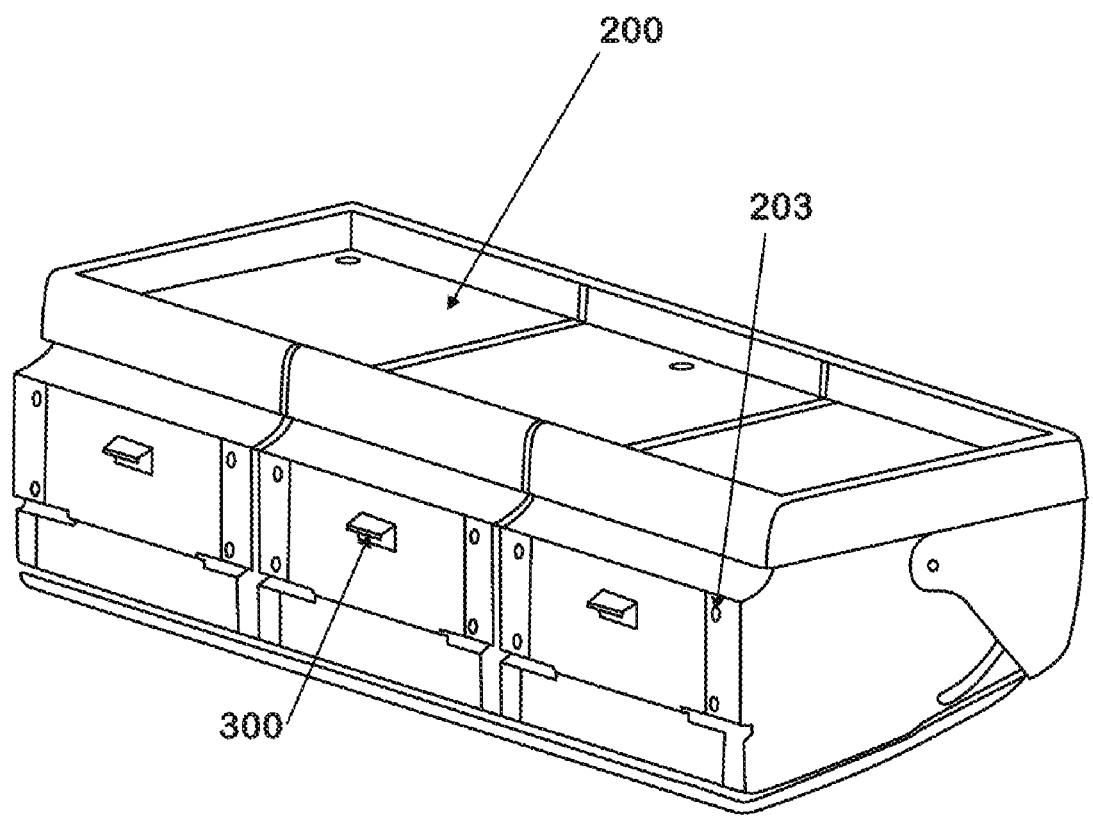
FIG. 3—An embodiment of the present invention, a vehicle cabinet having mounting cleats, isometric rear view.
Figure 4:
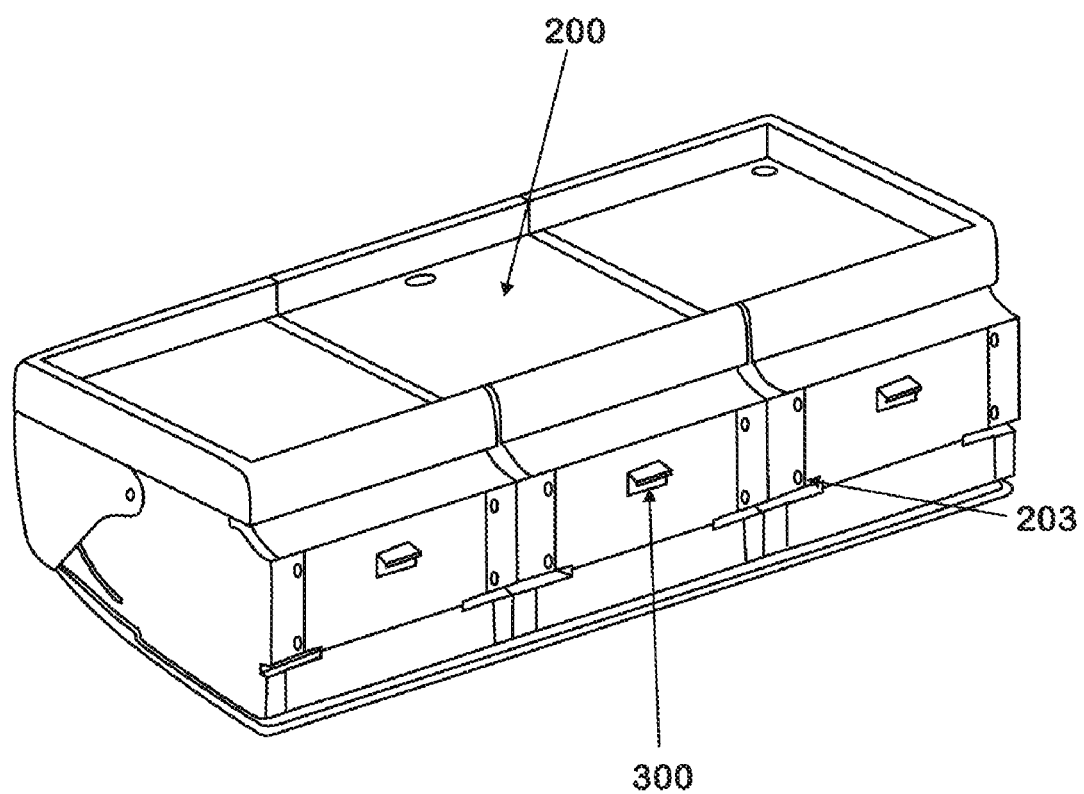
FIG. 4—An embodiment of the present invention, a vehicle cabinet having mounting cleats, isometric rear view.
Figure 5:
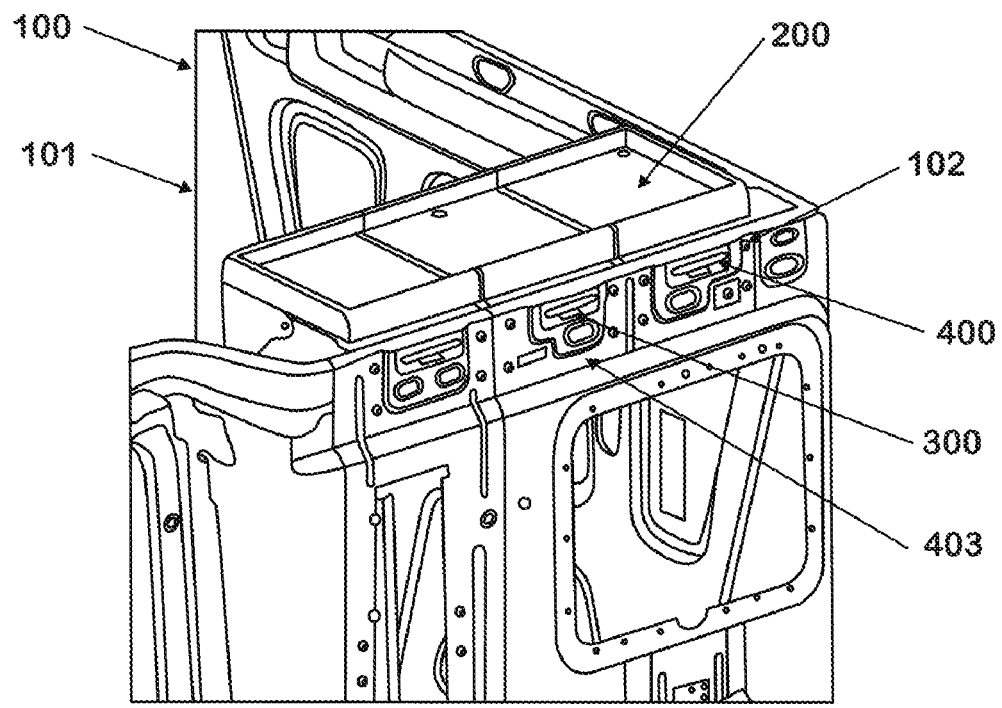
FIG. 5—An embodiment of the present invention, a vehicle cabin showing a cabinet with mounting cleats engaged with cleat receivers, isometric rear view.

FIGS. 3 and 4 both show cabinets 200 having cleats 300 and mounting holes 203. FIG. 5 shows such a cabinet 200 installed in a vehicle cabin 100. The cleats 300 are engaged with the cleat receivers 400 which are formed from the vehicle cabin sheet metal 101. The cleat receivers 400 again have formed cleat receiver reinforcing material offsets 403, in order to reduce strain in the vehicle cabin sheet metal 101, and to provide firm support for the one or more cabinets 200. Additional mounting holes 102 are provided so that the cabinets 200 may be fully secured using conventional fasteners 500 (not shown).

Figure 6:
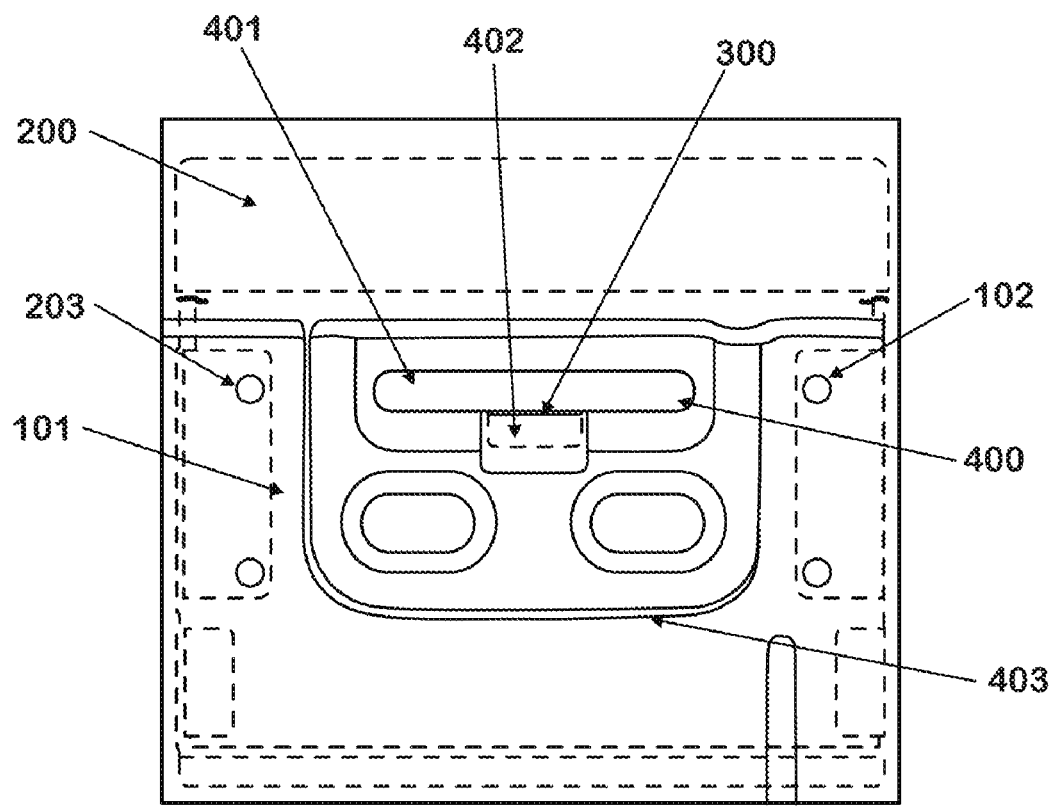
FIG. 6—An embodiment of the present invention, a vehicle cabinet having a mounting cleat engaged with a cleat receiver, rear view.

FIG. 6 shows a rear view of a cabinet 200 installed in a vehicle cabin 100. The vehicle cabin sheet metal 101 is shown partially transparent so that additional detail may be seen. Mounting holes 102 and a cleat receiver 400 are provided in the vehicle cabin sheet metal 101, as well as a formed cleat receiver reinforcing material offset 403. The cleat receiver 400 is provided with a cleat receiver wide section 401, and a cleat receiver lower notch 402, so that the cleat 300 of the cabinet 200 first engages the cleat receiver wide section 401 upon installation of the cabinet 200. Thereafter, with a small side to side adjustment of the cabinet 200, the cleat 300 drops into the cleat receiver lower notch 402. When this happens, the cabinet mounting holes 203 align with the mounting holes 102, so that conventional fasteners 500 (not shown) may be used to fully secure the cabinet 200.

Figure 7:
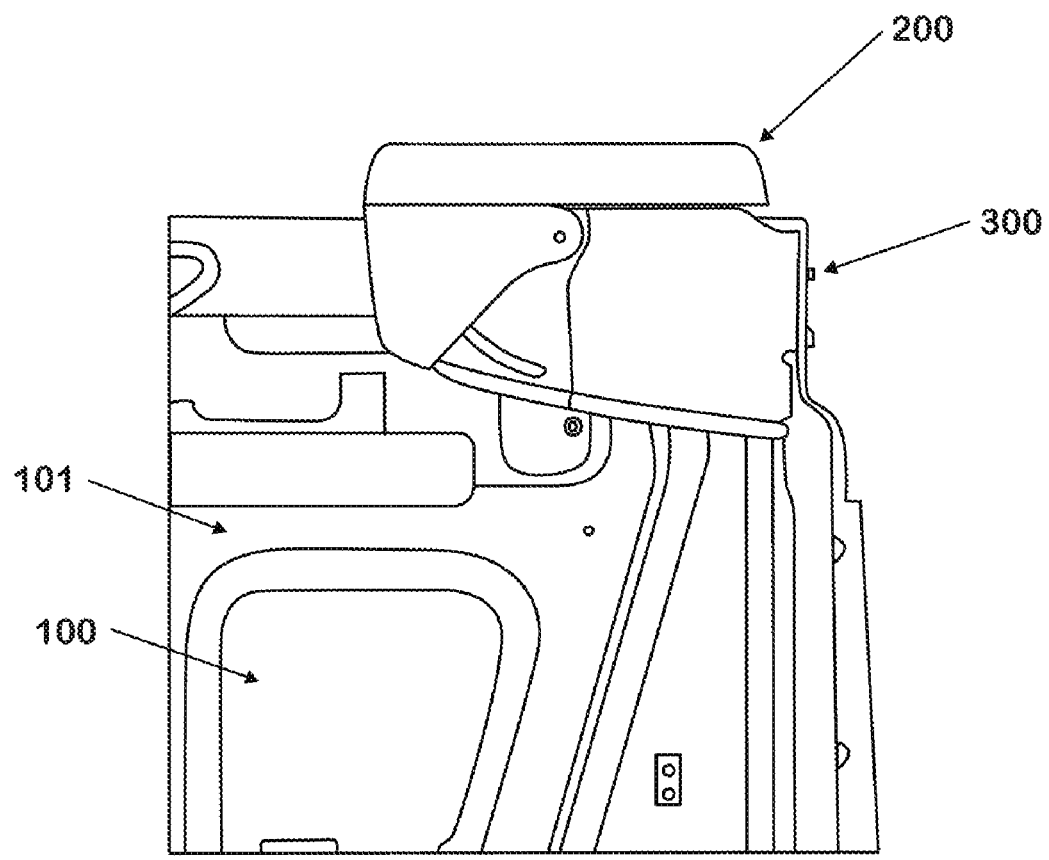
FIG. 7—An embodiment of the present invention, a vehicle cabin showing a cabinet installed, side view.
Figure 8:
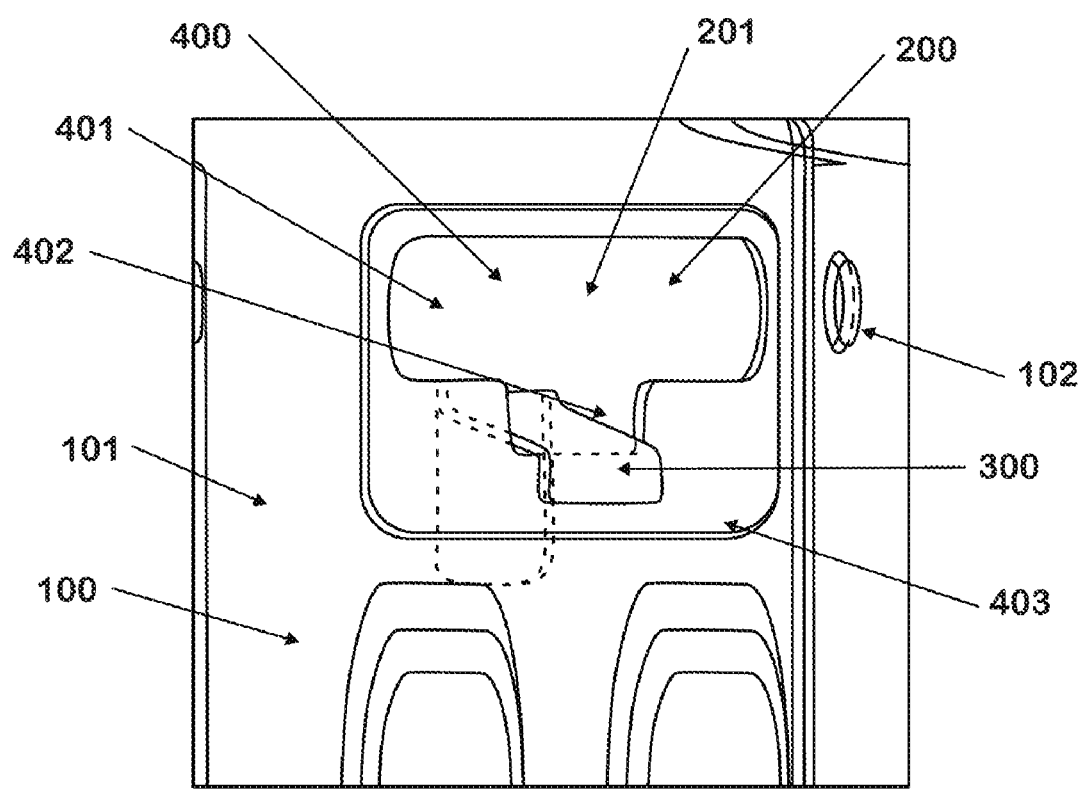
FIG. 8—An embodiment of the present invention, a cabinet cleat engaged with a cleat receiver, rear isometric view.
Figure 9:
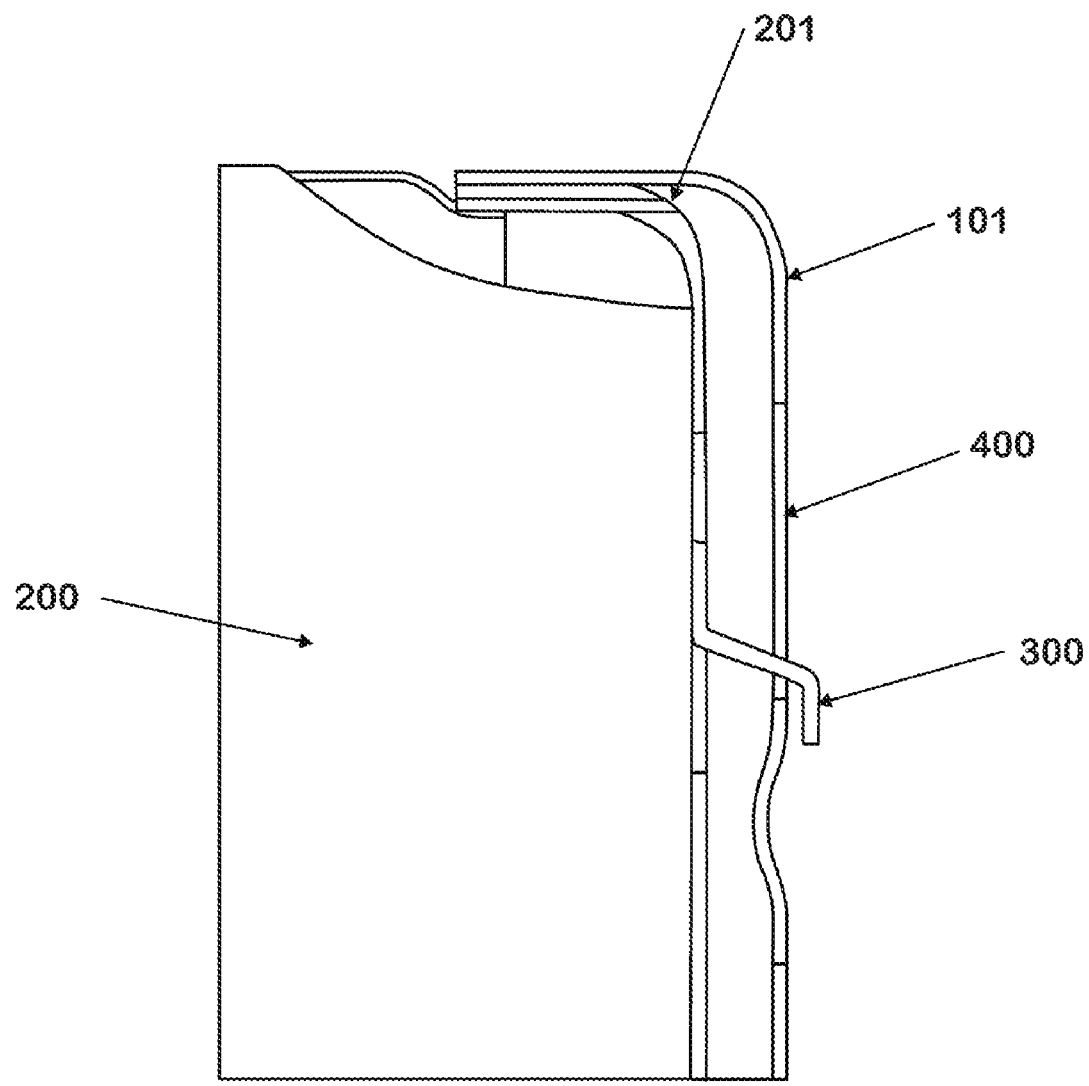
FIG. 9—An embodiment of the present invention, a cabinet cleat engaged with a cleat receiver, side view sectional.
Figure 10:
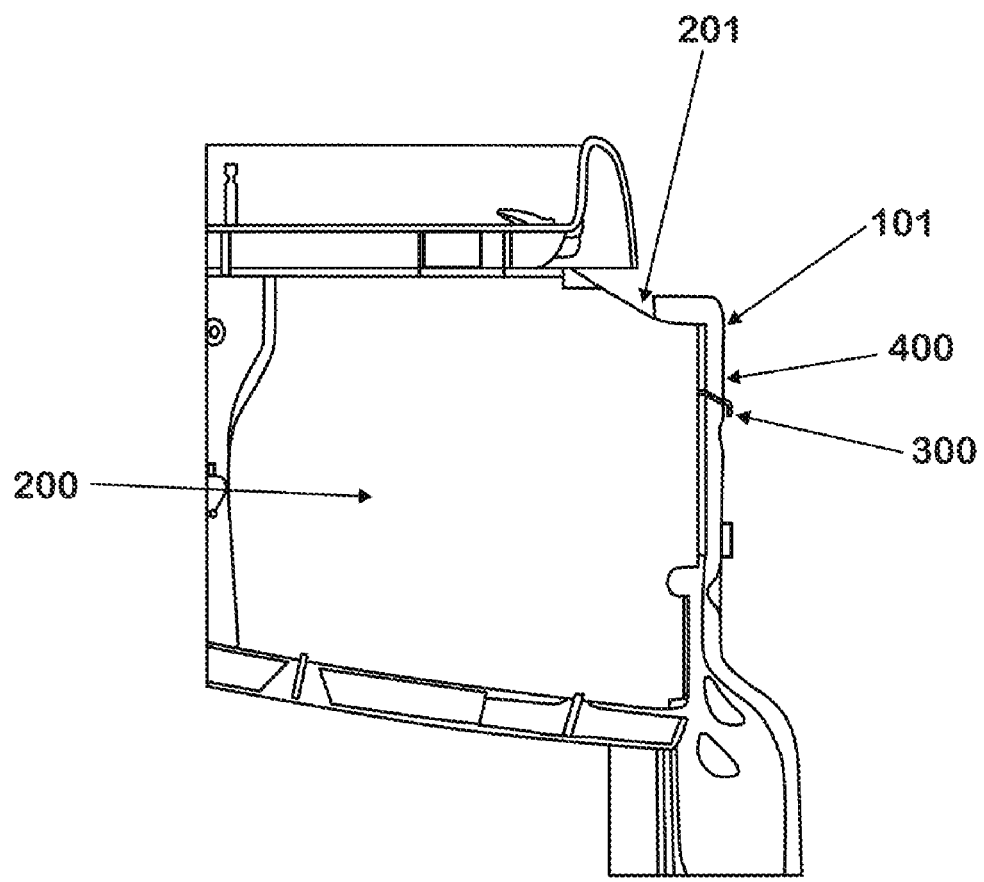
FIG. 10—An embodiment of the present invention, a cabinet cleat engaged with a cleat receiver, side view sectional.
Figure 11:
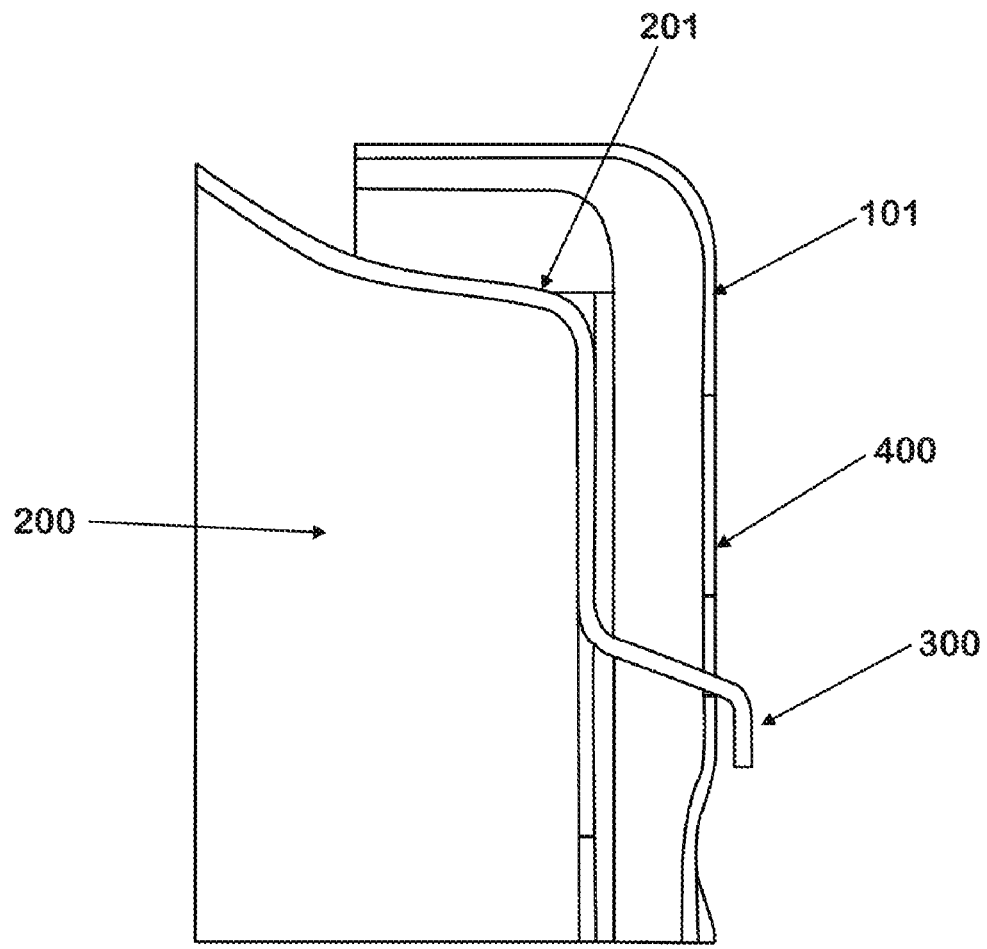
FIG. 11—An embodiment of the present invention, a cabinet cleat engaged with a cleat receiver, side view sectional.
Figure 12:
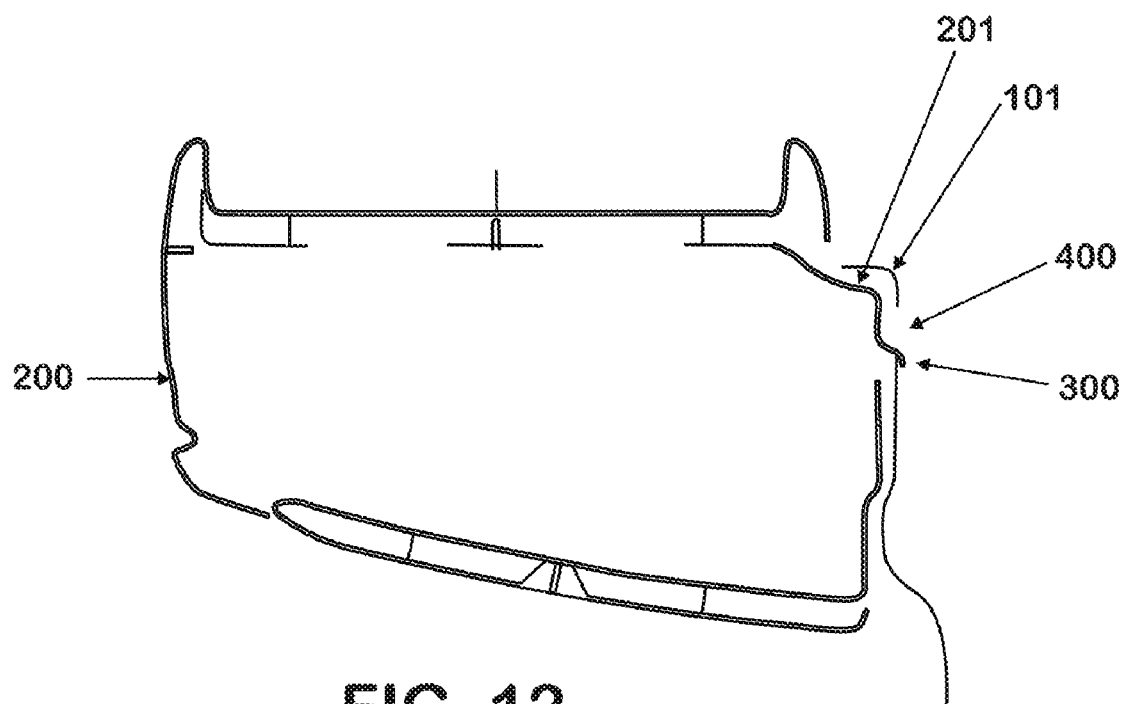
FIG. 12—An embodiment of the present invention, a cabinet cleat engaged with a cleat receiver, side view sectional.

FIG. 7 shows a side view of a cabinet 200 installed in a vehicle cabin 100. Cleats 300 are shown engaged with the vehicle cabin sheet metal 101. A similar cleat 300 is shown engaged with a cleat receiver 400 formed in vehicle cabin sheet metal 101 in FIG. 8. The cleat 300 is formed from the cabinet material 201 of the cabinet 200 which is to be installed in the vehicle cabin 100. The cleat receiver 400 is again provided with a cleat receiver wide section 401 and a cleat receiver lower notch 402, so that the cleat 300 of the cabinet 200 first engages the cleat receiver wide section 401 upon installation of the cabinet 200. As in FIG. 6, a small side to side adjustment of the cabinet 200 causes the cleat 300 to drop into the cleat receiver lower notch 402. When this happens, the cabinet mounting holes 203 (not shown) align with the mounting holes 102, so that conventional fasteners 500 (not shown) may be used to fully secure the cabinet 200.

Figure 13:
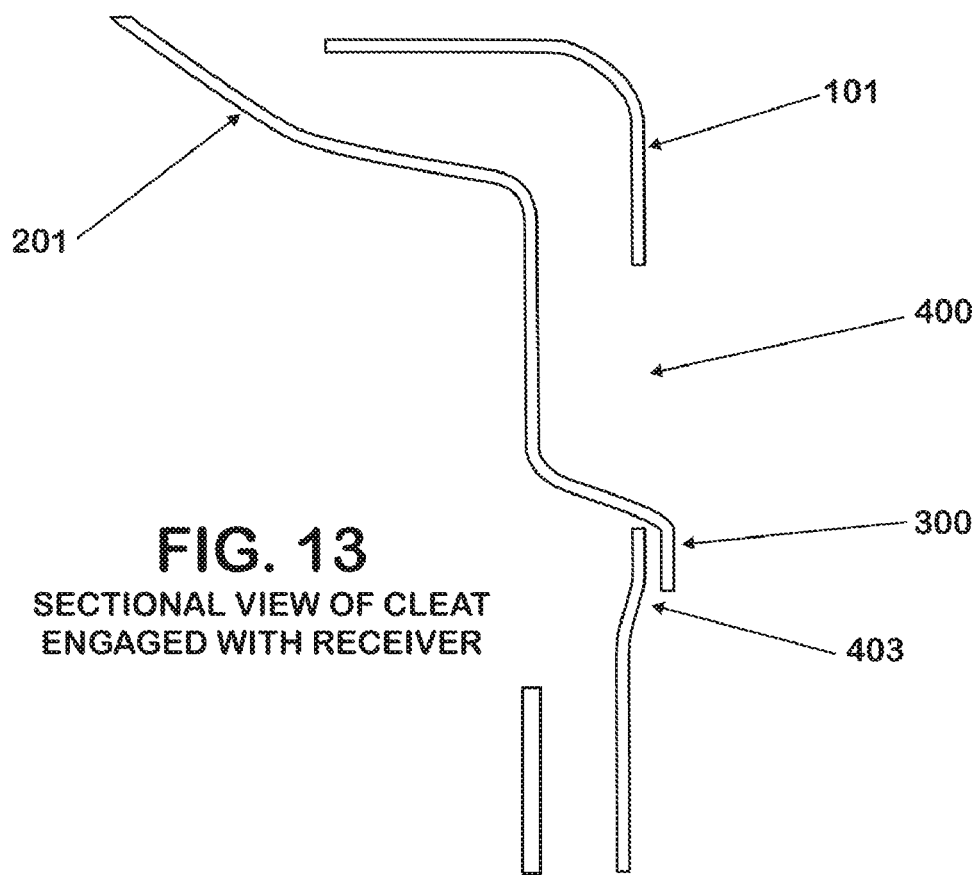
FIG. 13—An embodiment of the present invention, a cabinet cleat engaged with a cleat receiver, side view sectional.

FIGS. 9, 10, 11, and 12 each shows a sectional side view of a cabinet 200 having a cleat 300 formed from cabinet material 201, and engaging with a cleat receiver 400 formed from the vehicle cabin sheet metal 101. FIG. 13 also shows a sectional side view of a cleat 300 formed from cabinet material 201 engaging a cleat receiver 400 formed from the vehicle cabin sheet metal 101. FIG. 13 additionally shows the formed cleat receiver reinforcing material offset 403.

Figure 14:
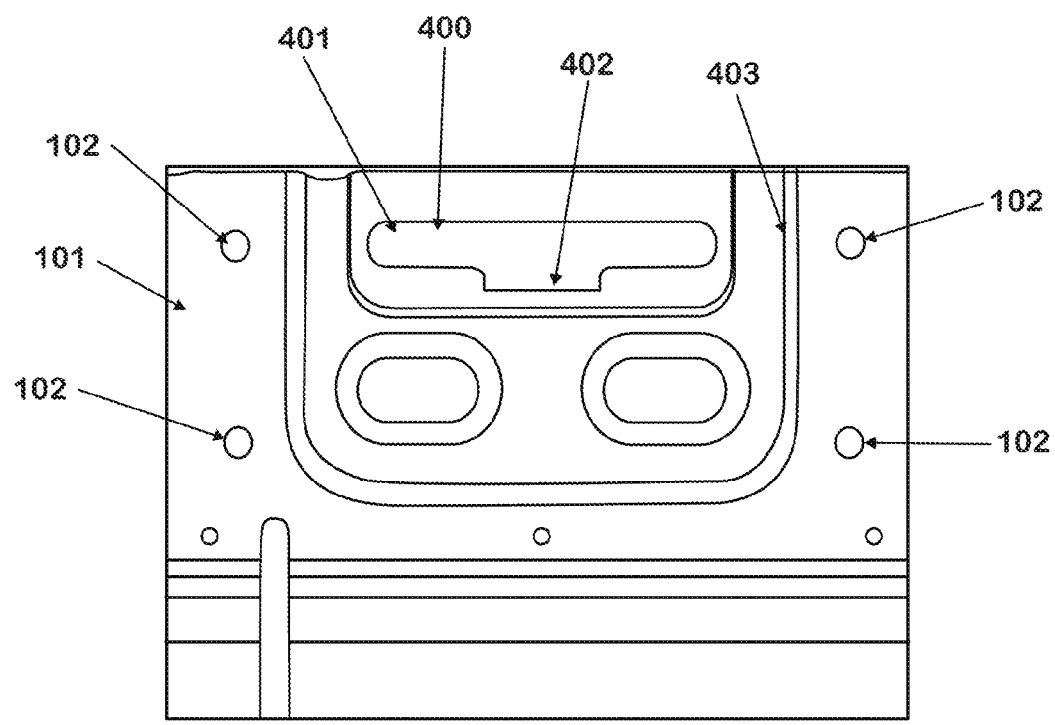
FIG. 14—An embodiment of the present invention, a vehicle cabin sheet metal having a cleat receiver.

FIG. 14 shows a detail of a cleat receiver 400 formed from vehicle cabin sheet metal 101. The cleat receiver 400 is again provided with a cleat receiver wide section 401 and a cleat receiver lower notch 402, along with a formed cleat receiver reinforcing material offset 403. The vehicle cabin sheet metal 101 is also provided with mounting holes 102.

Figure 15:
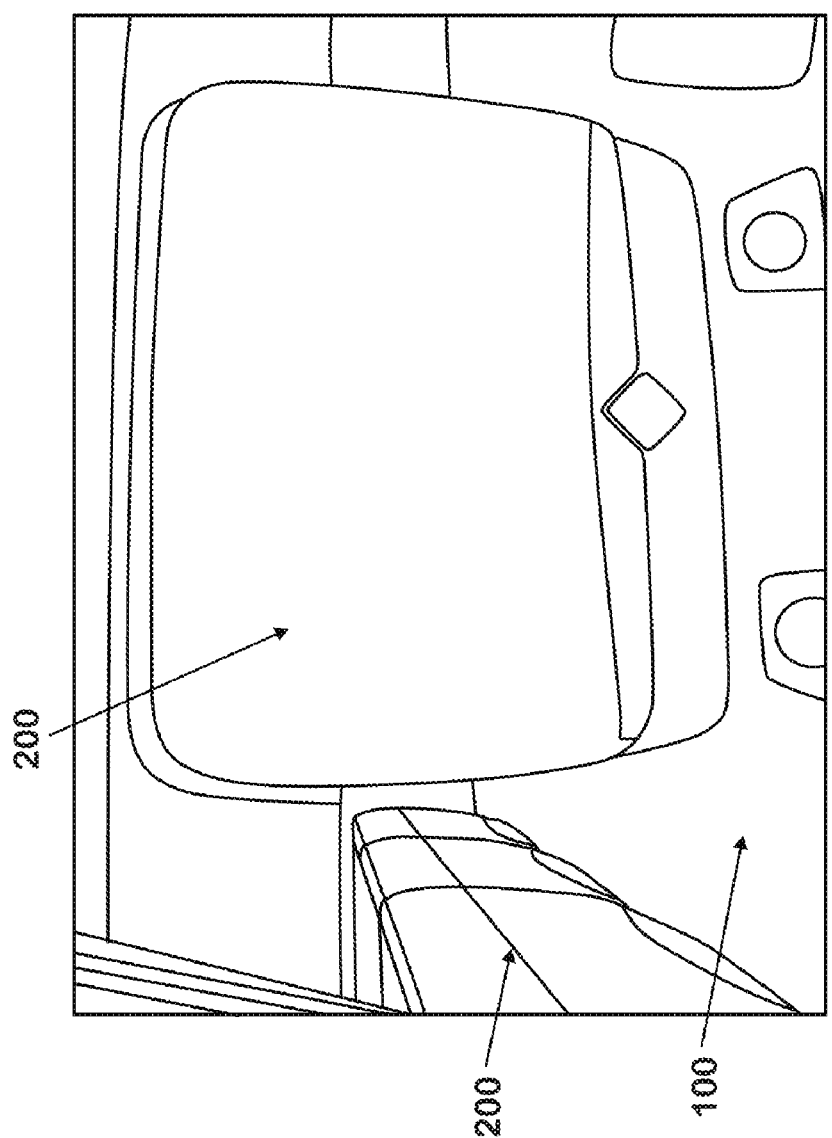
FIG. 15—An embodiment of the present invention, vehicle cabinets installed.
Figure 16:
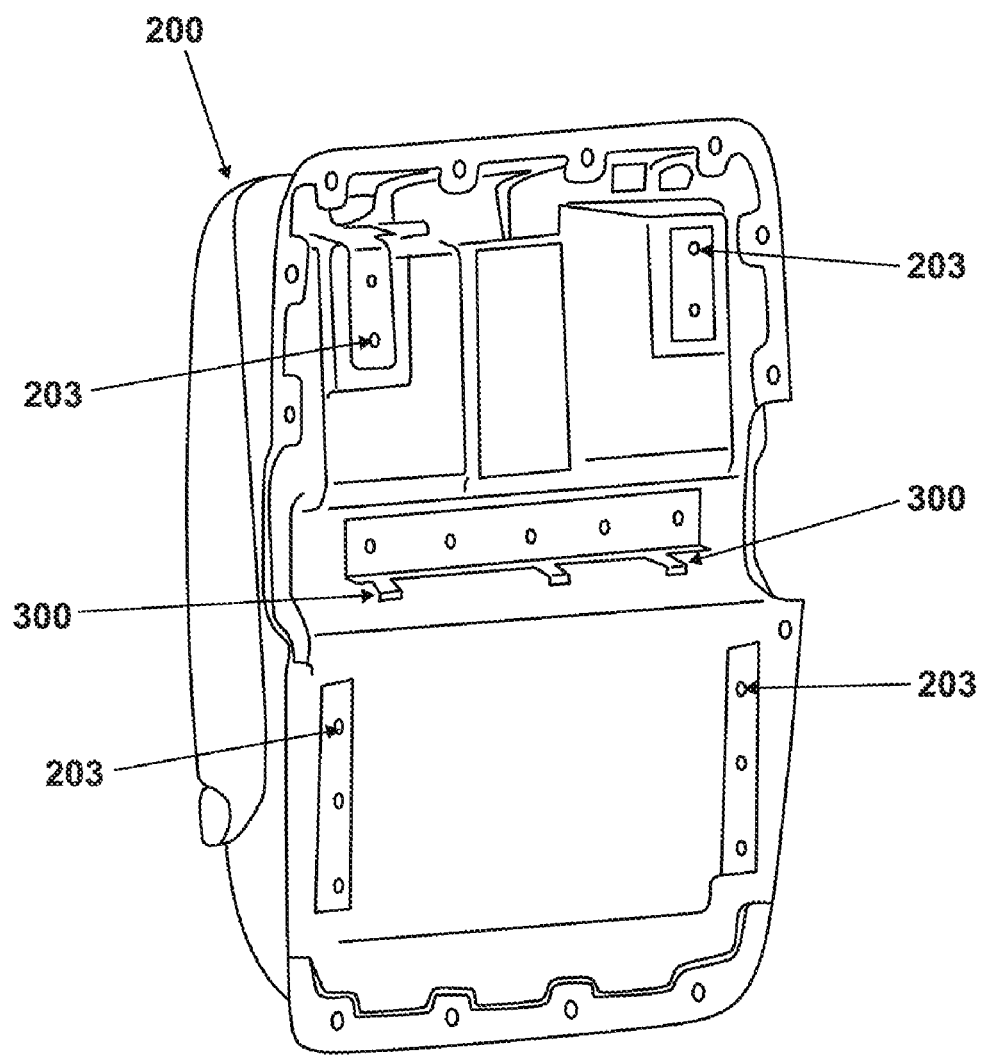
FIG. 16—An embodiment of the present invention, a vehicle cabinet with cleats.
Figure 17:
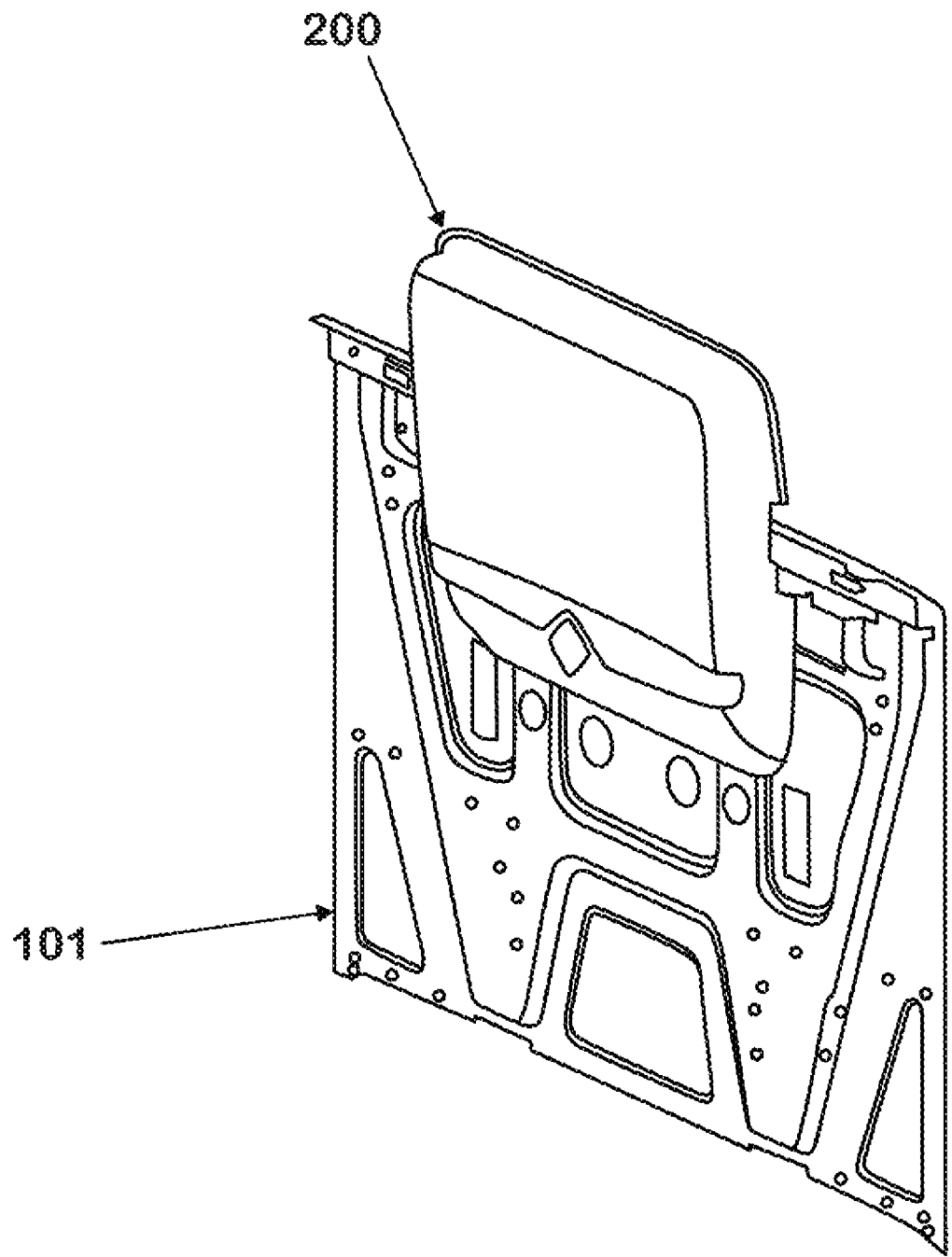
FIG. 17—An embodiment of the present invention, a vehicle cabinet with cleats, installed.

FIG. 15 shows a view of a vehicle cabin 100 having several varieties of cabinets 200 which may be used with the invention. One such cabinet 200 is shown in FIG. 16, and is provided with several cleats 300 which are formed separately from the cabinet material. This cabinet 200 is again provided with cabinet mounting holes 203, for attaching the cabinet 200 to the vehicle cabin 100 (not shown) using conventional fasteners 500 (not shown). The cabinet 200 is shown installed upon the vehicle cabin sheet metal 101 in FIG. 17.

Figure 18:
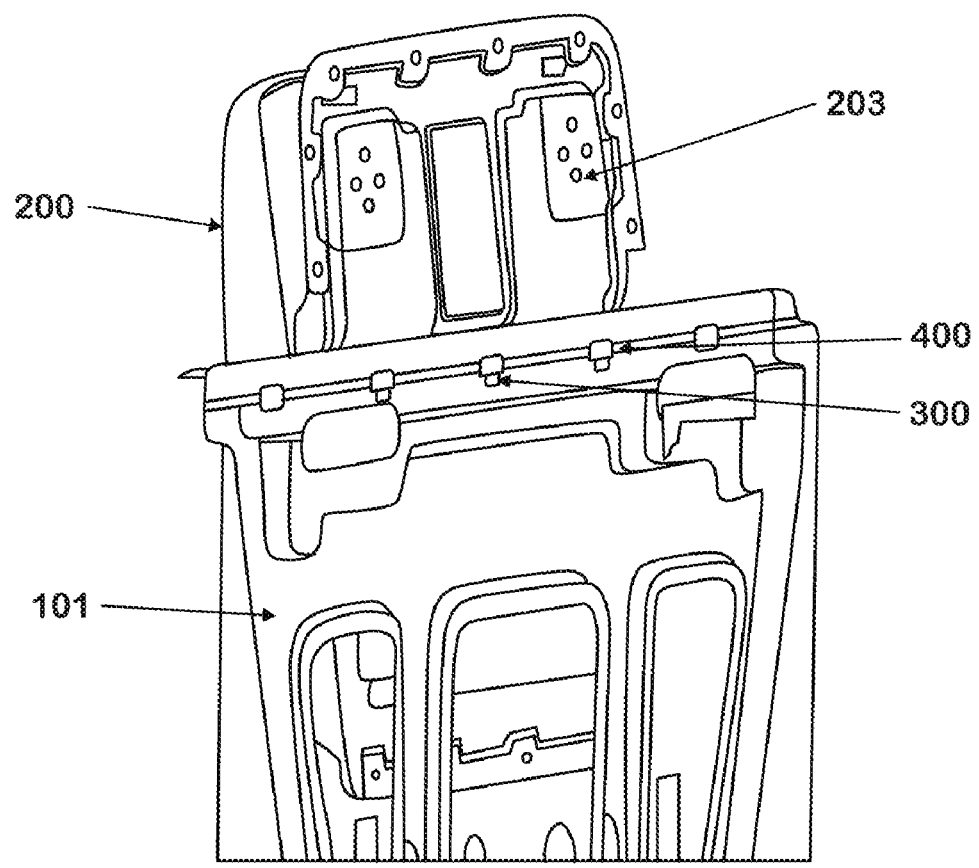
FIG. 18—An embodiment of the present invention, a vehicle cabinet with cleats, installed, rear view.
Figure 19:
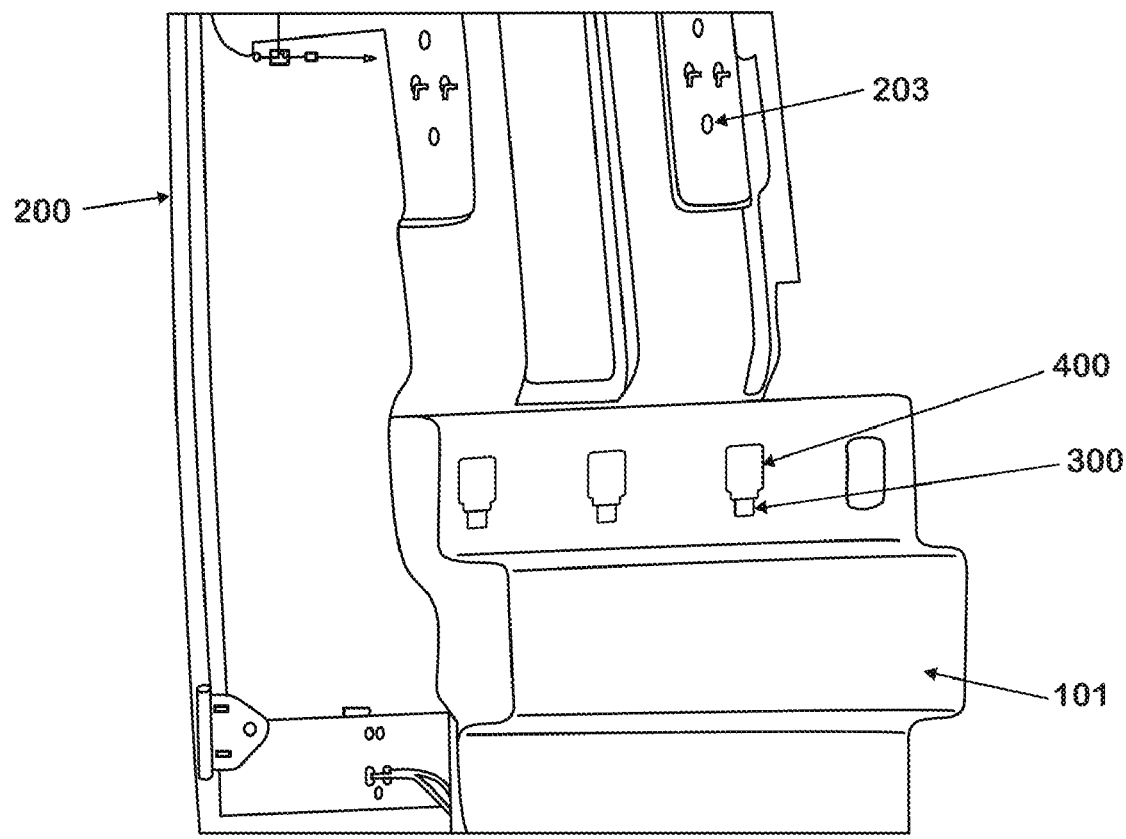
FIG. 19—An embodiment of the present invention, a vehicle cabinet with cleats, installed, partial rear view.

FIG. 18 also shows the cabinet 200 installed upon the vehicle cabin sheet metal 101, this time from the rear. The cleats 300 are shown engaged with the cleat receivers 400. Several of the cabinet mounting holes 203 are visible in FIG. 18. FIG. 19 shows a close-up view of the cabinet 200 installed upon the vehicle cabin sheet metal 101 from the rear. The cleats 300 are again shown engaged with the cleat receivers 400, with several of the cabinet mounting holes 203 being visible.

Figure 20:
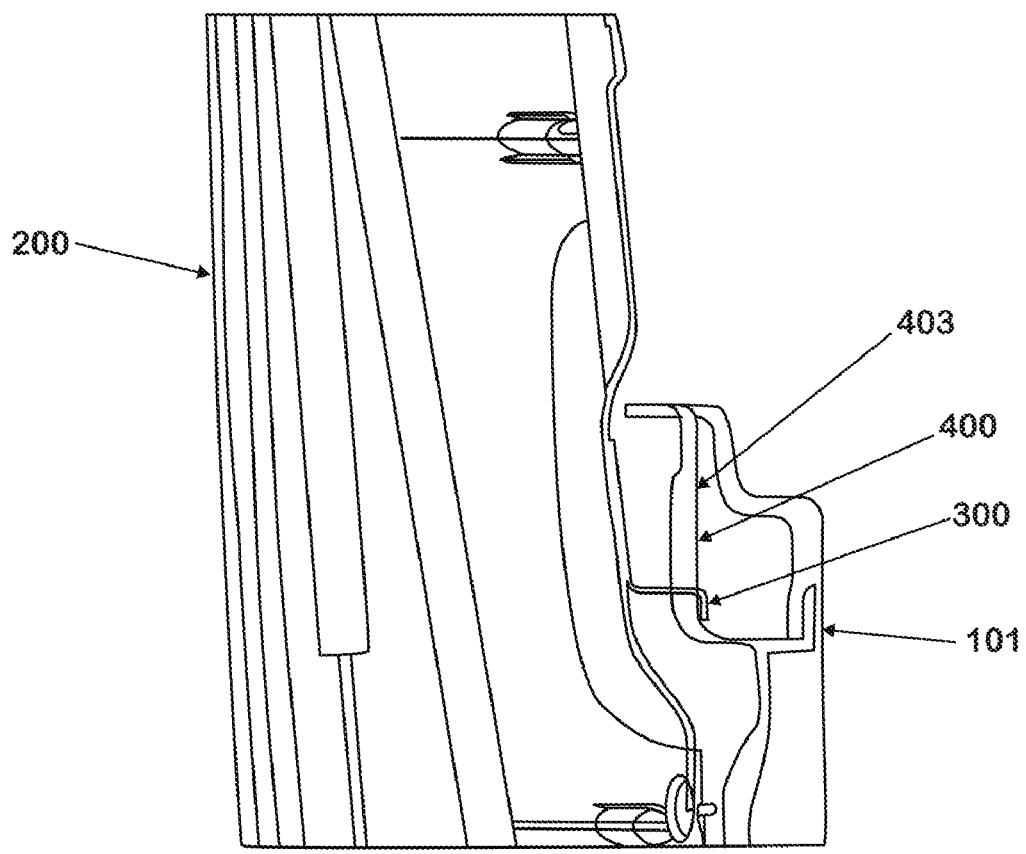
FIG. 20—An embodiment of the present invention, a vehicle cabinet with cleats, installed, side view sectional.

FIG. 20 shows a side view of the cabinet 200 installed upon the vehicle cabin sheet metal 101. The cleats 300 are shown engaged with the cleat receivers 400, which cleat receivers 400 are again provided with a formed cleat receiver reinforcing material offset 403.

Figure 21:
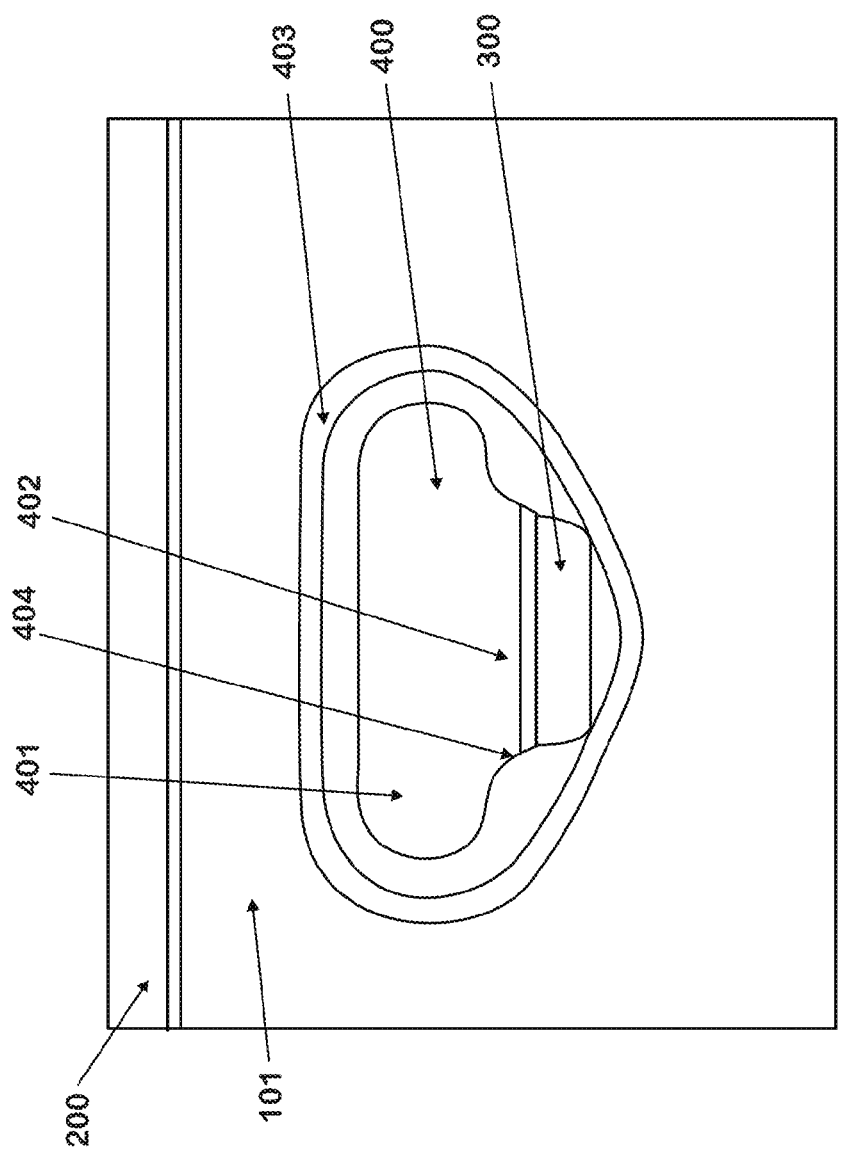
FIG. 21—An embodiment of the present invention, cleat engaged with a receiver, rear view.

FIG. 21 shows a detail of a cleat 300 engaging a cleat receiver 400 formed from vehicle cabin sheet metal 101. The cabinet 200 is visible behind the vehicle cabin sheet metal 101. The cleat receiver 400 is again provided with a cleat receiver wide section 401 and a cleat receiver lower notch 402, along with a formed cleat receiver reinforcing material offset 403. In this embodiment of the cleat receiver 400, the cleat receiver lower notch 402 is provided with cleat receiver lower notch tapered sides 404. The cleat receiver lower notch tapered sides 404 assist in the process of engaging the cleat 300 with the cleat receiver 400, in that once the cleat 300 has engaged the cleat receiver wide section 401, and the cabinet 200 is moved from side to side, the cleat 300 more readily drops into the cleat receiver lower notch 402.

Figure 22:
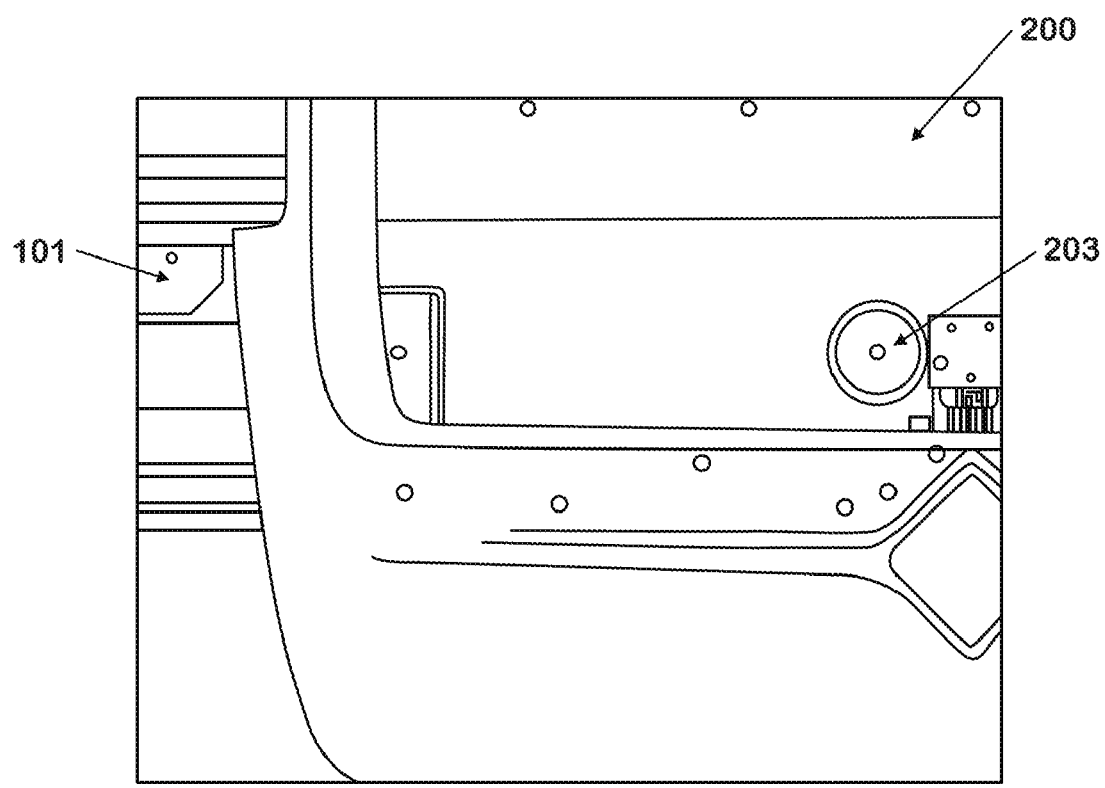
FIG. 22—An embodiment of the present invention, a vehicle cabinet with cleats, showing aligned mounting holes.

FIG. 22 shows a cabinet 200 installed upon the vehicle cabin sheet metal 101. The cabinet mounting holes 203 are shown from the front, thereby showing their accessibility to the installer.

While specific embodiments have been described in detail in the foregoing detailed description and illustrated in the accompanying drawings, those with ordinary skill in the art will appreciate that various permutations of the invention are possible without departing from the teachings disclosed herein. Accordingly, the particular arrangements disclosed are meant to be illustrative only and not limiting as to the scope of the invention, which is to be given the full breadth of the appended claims and any and all equivalents thereof. Other advantages to a vehicle cabinet having cabinet cleats used in conjunction with a vehicle cabin having cabinet cleat receivers may also be inherent in the invention, without having been described above.

We claim:

1. A vehicle for operation on the ground, comprising:
a vehicle cabin formed from sheet metal, said vehicle cabin having at least one cleat receiver, said at least one cleat receiver having an upper wide section and a lower notch, said lower notch having tapered sides;
a cabinet installed in said vehicle cabin, said cabinet having at least one cleat, said at least one cleat engaging said at least one cleat receiver lower notch;
said upper wide section of said at least one cleat receiver being at least one and a half times as wide as said at least one cleat such that said at least one cleat may first engage said upper wide section upon installation of said cabinet in said vehicle cabin without requiring horizontal alignment of said at least one cleat to said at least one cleat receiver, said at least one cleat dropping into said lower notch upon horizontal manipulation of said cabinet subsequent to said engagement of said at least one cleat to said upper wide section of said at least one cleat receiver.

2. The vehicle for operation on the ground of claim 1, wherein:
said at least one cleat receiver is formed from said sheet metal of said vehicle cabin.

3. The vehicle for operation on the ground of claim 2, wherein:
said at least one cleat receiver has a formed reinforcing material offset.

4. The vehicle for operation on the ground of claim 1, wherein:
said cabinet is at least partially formed from sheet material; and
said at least one cleat is formed from said sheet material from which said cabinet is at least partially formed.

5. The vehicle for operation on the ground of claim 1, wherein:
said cabinet is at least partially formed from sheet material; and
said at least one cleat is formed from material separate from said sheet material from which said cabinet is at least partially formed.

6. The vehicle for operation on the ground of claim 1, wherein:
said at least one cleat is formed at a downwards angle.

7. The vehicle for operation on the ground of claim 1, wherein:
said cabinet being provided with predrilled fastener holes;
said sheet metal of said vehicle cabin being provided with predrilled fastener holes; and
said at least one cleat cooperating with said at least one cleat receiver to position said cabinet such that said predrilled fastener holes in said cabinet align with said predrilled fastener holes in said sheet metal of said vehicle cabin.

* * * * *